(12) United States Patent
Hookham-Miller

(10) Patent No.: US 9,111,302 B2
(45) Date of Patent: Aug. 18, 2015

(54) COMMUNICATION METHOD, APPARATUS AND SYSTEM FOR A RETAIL ORGANIZATION

(75) Inventor: Peter Hookham-Miller, London (GB)

(73) Assignee: PHM ASSOCIATES LIMITED, London (GB)

( * ) Notice: Subject to any disclaimer, the term of this patent is extended or adjusted under 35 U.S.C. 154(b) by 1059 days.

(21) Appl. No.: 12/023,486

(22) Filed: Jan. 31, 2008

(65) Prior Publication Data

US 2009/0199102 A1 Aug. 6, 2009

(51) Int. Cl.
*G06F 3/0481* (2013.01)
*G06Q 30/06* (2012.01)

(52) U.S. Cl.
CPC ................... *G06Q 30/06* (2013.01)

(58) Field of Classification Search
CPC ........................................... H04L 29/06
USPC .................. 715/733; 709/202, 203
See application file for complete search history.

(56) References Cited

U.S. PATENT DOCUMENTS

| | | | | |
|---|---|---|---|---|
| 5,117,350 A * | 5/1992 | Parrish et al. | ...................... | 711/1 |
| 5,567,847 A * | 10/1996 | Vedage et al. | ................ | 564/493 |
| 5,610,841 A * | 3/1997 | Tanaka et al. | ................. | 725/115 |
| 5,966,451 A * | 10/1999 | Utsumi | ............................ | 380/51 |
| 6,169,547 B1 * | 1/2001 | Tanaka et al. | ................. | 715/838 |
| 6,317,795 B1 * | 11/2001 | Malkin et al. | ................. | 709/246 |
| 6,400,375 B1 * | 6/2002 | Okudaira | ...................... | 345/668 |
| 6,460,076 B1 * | 10/2002 | Srinivasan | .................... | 709/219 |
| 6,556,217 B1 * | 4/2003 | Makipaa et al. | .............. | 345/667 |
| 6,594,675 B1 * | 7/2003 | Schneider | ..................... | 707/703 |
| 6,832,241 B2 * | 12/2004 | Tracton et al. | ................ | 709/203 |
| 7,366,460 B2 | 4/2008 | O'Farrell et al. | | |
| 7,373,515 B2 * | 5/2008 | Owen et al. | .................... | 713/182 |
| 7,519,910 B2 * | 4/2009 | Saka | ............................. | 715/748 |
| 8,099,109 B2 * | 1/2012 | Altman et al. | ............. | 455/456.3 |
| 8,209,394 B2 * | 6/2012 | Guo et al. | ..................... | 709/217 |
| 8,245,142 B2 * | 8/2012 | Mizrachi et al. | .............. | 715/744 |
| 8,266,304 B2 * | 9/2012 | Hartman et al. | ............. | 709/229 |
| 8,321,684 B2 * | 11/2012 | Mumm et al. | ................ | 713/186 |
| 8,407,310 B2 * | 3/2013 | Murai et al. | .................. | 709/217 |
| 8,626,708 B2 * | 1/2014 | Laitinen et al. | .............. | 707/611 |
| 8,644,842 B2 * | 2/2014 | Arrasvuori et al. | ........ | 455/456.1 |
| 2002/0016801 A1 * | 2/2002 | Reiley et al. | .................... | 707/523 |
| 2002/0059237 A1 * | 5/2002 | Kumagai et al. | ................. | 707/9 |
| 2003/0080995 A1 * | 5/2003 | Tenenbaum et al. | .......... | 345/738 |
| 2003/0110272 A1 * | 6/2003 | du Castel et al. | ............ | 709/229 |

(Continued)

FOREIGN PATENT DOCUMENTS

WO   WO 2006123101 A1 * 11/2006

*Primary Examiner* — Phenuel Salomon
(74) *Attorney, Agent, or Firm* — Arent Fox LLP

(57) ABSTRACT

A data communication method and apparatus for a retail organization is disclosed. In the method an intermediate data processing entity generates a set of data for sending to at least one mobile terminal based on data from at least one data processing device associated with the retail organization and send the generated set of data to the at least one mobile terminal. At least one mobile terminal may send user data to the intermediate data processing entity. Upon receipt of user data from at least one mobile terminal the received user data is processed in the intermediate data processing entity to determine if data is to be communicated from the intermediate data processing entity. If it is determined that communication of data is needed, data can be communicated to at least one of a data processing device associated with the retail organization and at least one mobile terminal.

30 Claims, 5 Drawing Sheets

(56) References Cited

U.S. PATENT DOCUMENTS

| | | | |
|---|---|---|---|
| 2003/0166414 A1* | 9/2003 | Sako et al. | 463/30 |
| 2004/0093396 A1* | 5/2004 | Akune | 709/219 |
| 2004/0214556 A1* | 10/2004 | Yamada | 455/414.3 |
| 2005/0216460 A1* | 9/2005 | Yoon et al. | 707/6 |
| 2006/0047634 A1* | 3/2006 | Aaron et al. | 707/3 |
| 2007/0016695 A1* | 1/2007 | Rabbers et al. | 709/248 |
| 2007/0254737 A1* | 11/2007 | Sako et al. | 463/30 |
| 2008/0090512 A1* | 4/2008 | Little et al. | 455/1 |
| 2009/0044124 A1* | 2/2009 | Pihlaja | 715/733 |

* cited by examiner

COMMUNICATION METHOD, APPARATUS AND SYSTEM FOR A RETAIL ORGANIZATION

FIELD OF THE INVENTION

The present invention relates to communications in a retail organization.

BACKGROUND

A common model of selling and delivering, or retailing, goods and/or services in a wide geographical area is to have a plurality of local or regional sales organizations. The local organizations cover each a different country or a specific area, for example a part of a continent. The local organizations can have a varying degree of responsibility in locally organizing the actual sales and delivery of goods and/or services to consumers or other clients.

Selling of automotive products, for example cars, accessories and/or parts thereof, can be mentioned as an example of a global retail organization where a great number of local organizations, possible smaller intermediate organizations, and typically thousands of dealers are involved. Thus the manner how automotive products dealerships can be organized will be used in this description as an example of a global retail organization.

In a typical sales organization for automotive products a manufacturer with global markets communicates with a national or regional higher level sales organization in each country or region. The head offices of the national organizations then communicate either directly with dealers in different areas, or with a further organizational layer such as a state level sales organization. Even the national level is then typically divided into a plurality zones or areas, each typically with a number of sales units known as dealers. In the sales organization information is passed horizontally between the different levels.

A large multilayered organization typically requires substantial amount of resources to ensure that all those who need information coming from the top do receive it and also that any feedback is properly processed, such as filtered, and that any important information is not lost in the system but is fed back to the top level. Ensuring that appropriate information and training is communicated to correct recipients in timely fashion can require a considerable amount of administration and management resources. For example, managing of product launches and/or new product variations or modifications may require communication through multiple hierarchical layers, each equipped with their own systems. The communication may involve a number of different data processing systems, each introducing complexity to the system.

For example, the local retailing units are typically equipped with their own computerised information systems. In automotive products industry these are often referred to as dealer management systems. The local and intermediate level systems can be provided by a number of different suppliers and based on different software and hardware component, protocols and so on. The manufacturer's systems are typically based on big mainframe computers which may not be well suited for communication with distributed data systems. This all affects the interoperability between the systems in different locations and levels.

Access to higher level systems can be restricted so that the lower levels of an organization may have only limited access rights, if any rights at all, to the higher level systems. Even if the access rights are given for all relevant personnel, information may be obtained only in a particular location, for example via a computer terminal in the local sales office. This can inhibit the sales personnel from even trying to access the information, for example in the middle of sales negotiations in a showroom or forecourt. This can mean that the front line sales staff cannot easily access data available e.g. at the manufacturer's databases, in particular when there is an immediate need for the data for ensuring proper understanding of the product and efficient sales. There may also be interoperability problems and delays in communications between the various different local systems and the manufacturer's mainframe computers, which can further discourage efficient use of the data systems.

As a result the communication channel can be long, complex and difficult to use. There may also be severe interoperability, delay and engagement problems in communications. In addition to introducing complexity and delays to communications from the top to the bottom and vice versa, information and messages may get distorted, send to wrong recipients, and even worse, lost.

Occasions such as new product launches, for example introduction of a new car model, sales campaigns, special offers and so on can involve a considerable amount of communications between various organizational layers, travel and training sessions, and can therefore be very costly. More communications is also required because product life spans are getting shorter. There is also an increasing demand to make modifications to existing products and add new variations in relatively short notices. The inflexible management systems and multilayered communication channels may cause unnecessary delay in the communications of relevant information in such situations. The frontline sales personnel should nevertheless receive enough accurate information and training as quickly as possible to ensure smooth introduction of the new product lines, modifications and variations. The front line sales personnel should also be able to quickly feed back information of any feedback they receive from the clients and of any other observations they might have concerning the new or somehow altered products. Therefore anything that could shorten the communication channel, reduce the complexity and improve the quality of communications over the different hierarchy levels would be desired.

SUMMARY

The embodiments aim to address one of more of the above shortcomings.

In accordance with an embodiment there is provided a data communication method for a retail organization. In the method an intermediate data processing entity generates a set of data for sending to at least one mobile terminal based on data from at least one data processing device associated with the retail organization and send the generated set of data to the at least one mobile terminal. The intermediate data processing entity may then receive user data from the at least one mobile terminal, and process the received user data to determine if data is to be communicated from the intermediate data processing entity to at least one of a data processing device associated with the retail organization and at least one mobile terminal.

According to an embodiment, there is provided an apparatus for managing data communications with at least one mobile terminal. The apparatus comprises an interface configured for data communication with at least one mobile data terminal and at least one data processing device associated with a retail organization and at least one processor configured to generate a set of data for sending to the at least one mobile terminal based on data from the retail organization, to control sending of the generated set of data to the at least one mobile terminal, to process user data received from the at least one mobile terminal to determine if data is to be communicated from the intermediate data processing entity to at least one of a data processing device associated with the retail organization and at least one mobile terminal.

According to a further embodiment, there is provided a system for data communications in a retail organization, the system comprising at least one data processing device associated with a retail organization, an intermediate data processing entity connected to the at least one data processing device and to a data network, and at least one mobile terminal. The at least one mobile terminal is configured to receive data from the intermediate data processing entity, to present information based on the said data, to allow a user thereof to input data, and to send the input to the intermediate data processing entity for further processing. The intermediate data processing entity is configured to generate sets of data based on data from the at least one data processing device and to process data received from the at least one mobile terminal to determine if data is to be communicated from the intermediate data processing entity to at least one of a data processing device associated with the retail organization and at least one mobile terminal.

According to a yet further embodiment, there is provided a computer program comprising program code means adapted to perform the steps of generating a set of data for sending from an intermediate data processing entity to at least one mobile terminal based on data from a data processing device associated with a retail organization, sending the generated set of data to the at least one mobile terminal, receiving user data from the at least one mobile terminal, and processing the received user data to determine if data is to be communicated from the intermediate data processing entity to at least one of a data processing device associated with the retail organization and at least one mobile terminal.

According to a more specific embodiment, a display is presented on a user interface by the at least one mobile terminal based on data received from the intermediate data processing entity where after a user is enabled to input data via the user interface and the input can be sent to the intermediate data processing entity for further processing.

In accordance with a specific form, a plurality of remote users each is provided with a mobile terminal of a first type. Selected data may be communicated only to said mobile terminals of the first type. All remote users may be provided with mobile terminals of a type.

Data may be pushed from the intermediate data processing entity to the at least one mobile terminal. The pushing may comprise pushing at least a part of an application and/or pushing content data.

Data may be tailored in the intermediate data processing entity based on information regarding recipient users. Tailoring may comprise adapting communications and/or data to be communicated to a mobile data terminal based on the said information regarding the recipient user.

The intermediate data processing entity may be operated and managed by a party that is separate from the retail organization.

A predefined event may trigger sending of instructions to present information by means of the at least one mobile terminal. Information may be presented substantially in real-time after detection of the triggering event.

Data may be adapted for presentation on a relatively small display before sending from the intermediate data processing entity.

At least a part of data received by the intermediate data processing entity may be stored in a database associated with the intermediate data processing entity. A report and/or content may be generated based on the received data.

The intermediate data processing entity may assign validation information to the generated data. Data may be communicated between the intermediate data processing entity and the at least one mobile terminal at predefined times.

The embodiments may provide various advantages. For example, the embodiments may reduce complexity and delay in communications between the front line sales personnel and higher level management. The quality of communications and accuracy of information communicated may be improved. Risks of information being out of date can be reduced. The interoperability problems in communications over different organizational layers can be eased. Possibility for essentially real-time feedback and an easy to use enquiry service can be provided. The front line sales may be provided with a direct and instant access to important information they may need during e.g. sales negotiations regardless the location they are. A better customer experience and improved, quicker and location independent customer service may also be achieved. The embodiments may provide a tool for different forms of variable marketing activities. A dynamic and flexible system can be provided that it is cost effective to implement and maintain.

BRIEF DESCRIPTION OF THE DRAWINGS

For a better understanding of the present invention and how the same may be carried into effect, reference will now be made by way of example only to the accompanying drawings in which.

DESCRIPTION OF CERTAIN EMBODIMENTS

Figure 1:
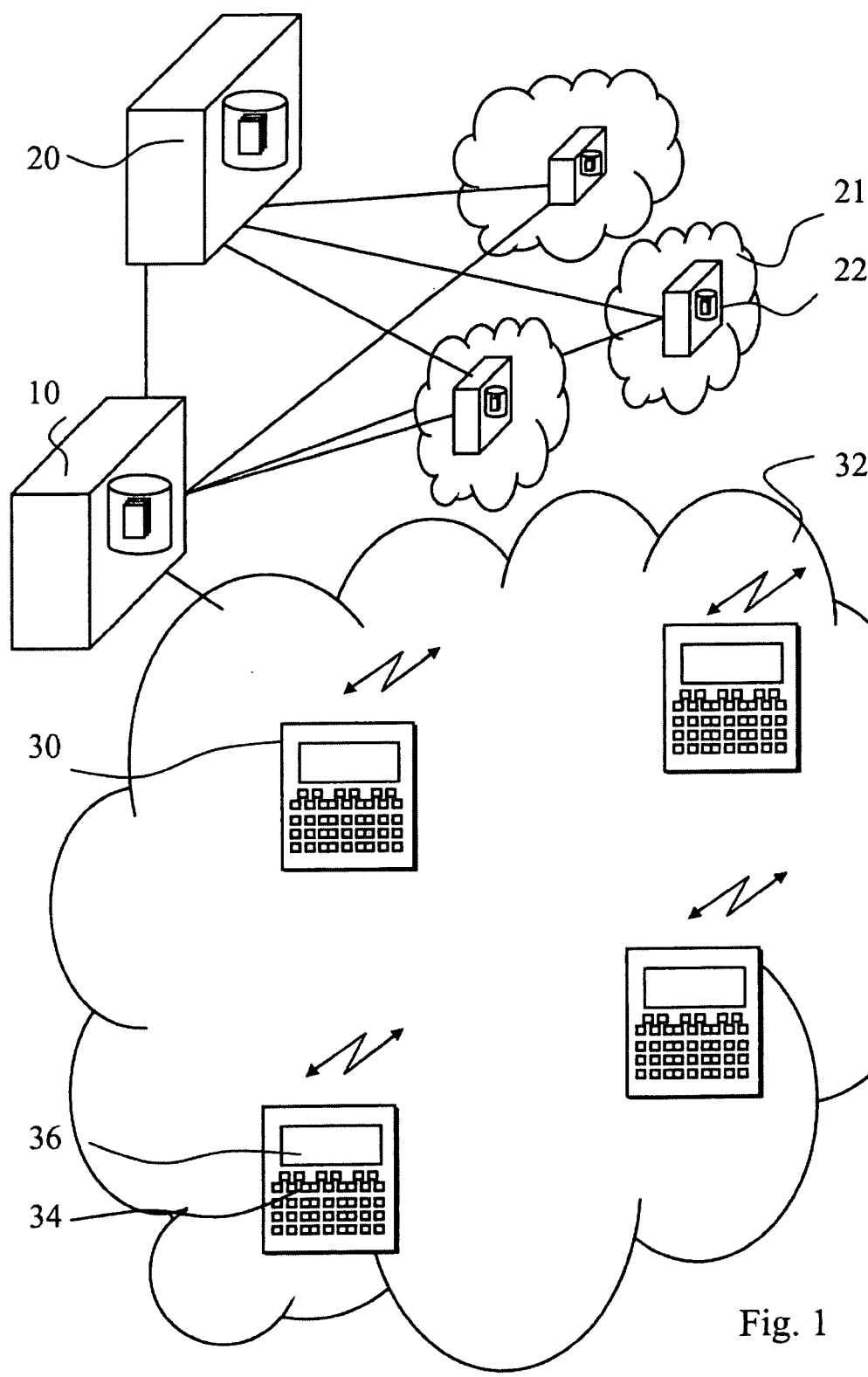
FIG. 1 shows a schematic architecture for a system for communication of data in a retail organization.

Before explaining in detail a few exemplifying embodiments, a brief explanation of certain general principles of mobile data terminals, data processing devices and communication of data via a data communication system is given with reference to FIG. 1.

FIG. 1 shows a number different types of data processing entities 10, 20, 22 and 30 that may be involved in a retailer management data communication system. In general, a data processing entity can be provided by a data processing device such as server, another computer device or a mobile data processing device. A data processing entity can be used for processing data and executing computer readable instructions, such as computer program code. A data processing entity may also communicate with other data processing entities via appropriate interfaces. To provide these and other functions a data processing device is typically provided with at least one data processor entity (i.e. a data processor), and data storage facilities. The data processing and storage facilities can be provided by means of at least one appropriate circuit board, hard drive, and/or chipset and internal and external memory devices.

Communication between remote data processing entities may be provided via a data network that is based on the Internet Protocol (IP) or any other appropriate data communication protocol for facilitating communication of data between at least two entities.

In FIG. 1, the data processing device 20 may be provided, for example, by a large, complicated and inflexible data processing system provided by means of mainframe computers run by a manufacturer of goods. The data processing device 20 may also be simply a server. For example, the data processing device 20 may be operated and managed by a manufacturer of cars or other automotive products. It shall be appreciated that the automotive products are only given herein as an example, and the goods can be other goods with wide markets, for example domestic goods such as kitchen appliances and home electronics, office equipment, or other goods retailed via a large network of retailer, or 'dealers', as they are often referred to. The data processing device 20 can be connected to an internal network, or intranet, of the manufacturer (not shown for clarity).

A plurality of local distributed data processing devices 22 are also shown. These local data processing devices are part of the local retail unit's information system. The local data processing devices can be of varying type, make, age and capability. An example of such systems is a dealer management system (DMS) commonly used by dealers of automotive products. The server 20 and thus the manufacturer is shown to be connected to the local management systems 21.

The data processing device 20 and the local data processing devices can be seen as devices that associate with the retail organization at the ends of the hierarchy thereof. That is, the data processing device 20 is provided by the manufacturer, i.e. the top level of the organization while the local data processing devices 22 are provided by the local dealer at the bottom of the hierarchy.

FIG. 1 shows a further data processing entity 10 connected to the data processing device 20 of the manufacturer and also to the data processing devices 22 of the local systems 21. Data processing entity 10 may comprise a server connected to a data network, for example the IP based Internet. The data processing entity 10 is preferably, although not necessarily, managed and maintained by a third party service provider. The role of the data processing entity 10 is to act as an intermediate between the manufacturers own data systems 20 and mobile user data terminals 30. Also, in certain embodiment the intermediate data processing entity can act between the data processing devices of the local management systems 21 and the other parties. Examples of the possible role(s) and functions of the intermediate data processing entity 10 will be given later in this specification.

A mobile communication system 32 and a plurality of remote mobile data terminals 30 each capable of wirelessly communicating via the system 32 are also shown. The mobile communication system can comprise any system providing mobility for the users thereof, for example a cellular mobile telephone network and/or at least one wireless local area network (WLAN). The mobile communication system 32 can be provided by means of a plurality of separate wireless access systems or access networks. It shall be understood that the mobile communication system 32 can be a large system, for example a system covering an entire continent or even a global system. It shall also be appreciated that although the data processing entity 10 is shown, for simplicity, as being connected directly to the mobile communication system 32, the connection can be provided via appropriate gateways and/or intermediate data networks.

Regardless the arrangement between the mobile system 32 and the data processing entity 10 and the technology used to provide the mobile communication system, an appropriate mobile data terminal 30 is provided with a wireless access to the data communication system via an appropriate wireless access interface between the mobile data terminal 30 and the wireless system 32. Examples of wireless access systems comprise those based on local wireless area networks (WLAN), WiFi networks or connections via mobile telecommunication systems, for example those based on the second generation (2G) or third generation (3G) mobile standards and air interfaces. An example of a possible air interface is an air interface based on the General Packet Radio Service (GPRS).

FIG. 1 shows a plurality of remote mobile data processing devices or terminals 30. The mobile data terminal 30 may be provided by means of mobile stations such as mobile personal data assistants or what are known as "smart phones". An example of these is a smart phone marketed under the trademark BLACKBERRY by Canadian company Research in Motion (RIM).

Each of the mobile terminal devices 30 is wirelessly connected to the mobile communication system 32. Each of the remote mobile terminals provide the distributed users thereof with a user interface for experiencing presentations and other information based on data communicated from the intermediate data processing entity 10.

A mobile data terminal is typically provided with at least one data processing entity, or a processor, and at least one storage entity for use in tasks it is designed to perform. A user may control the operation of the data terminal 30 by means of an appropriate user interface such as a key pad 34, voice commands, touch sensitive screen or touch sensitive keys, combinations thereof or the like. A speaker and a microphone (not shown) are typically also provided.

A display 36 is a common feature of a modern mobile terminal. The size of the display 36 is typically relatively small and is limited by the mobile nature of device. For example, possible screen sizes can be from 240×260 to 320× 240 pixels. Because of the limitations of the display, the intermediate server may be configured to adjust any presentation to fit the screen and/or be easily readable and informative even when displayed on what is a relatively small screen.

Furthermore, a user data terminal may comprise appropriate connectors (either wired or wireless) to other devices and/or for connecting external accessories, for example audio-video and/or multimedia accessories, thereto.

The user data terminals can be provided with an appropriate client application for controlling the communication between the intermediate data processing device or server 10 and the mobile data terminal 30. The application and/or any updates thereof as well any other data may be pushed to the mobile terminal 30 from the intermediate server 10. The push operation may be controlled by the intermediate server. The push operation may be triggered by an appropriate event, for example a command to send data, detection that data needs to be sent in response to an enquiry or response from a mobile terminal, expiry of a timer and so on. Further examples of the triggering events will be given later in this specification.

In accordance with a preferred embodiment the mobile terminals connected to the system are of one type. I certain embodiment a few variants may be allowed. Keeping the number of variants under control can assist in avoiding interoperability problems. Also, need for tailoring data at the intermediate data device 10 based on different types of the recipient devices can be avoided or at least mitigated. The overall "easiness" of managing communications to and from the retailer network may also be improved since use of single type or only a few types of terminals enables easier design of user interfaces dedicated for such devices, without the need to compromise between the different requirements of different devices. This, in turn, enables quick communication of information e.g. of a recent modification in a product to all terminals even globally.

It is noted the architecture of FIG. 1 is shown in order to give an example of a possible data communication arrangement where the embodiments described below may be provided. Other arrangements and architectures are also possible. For example, the mobile data terminals 30 may communicate via a number of different data networks with the server 10. Some of the networks may be open (e.g. the Internet) and some private (e.g. private local area networks, or Intranets). Also, local management systems 21 may not be necessary in all retail organizations.

Figure 2:
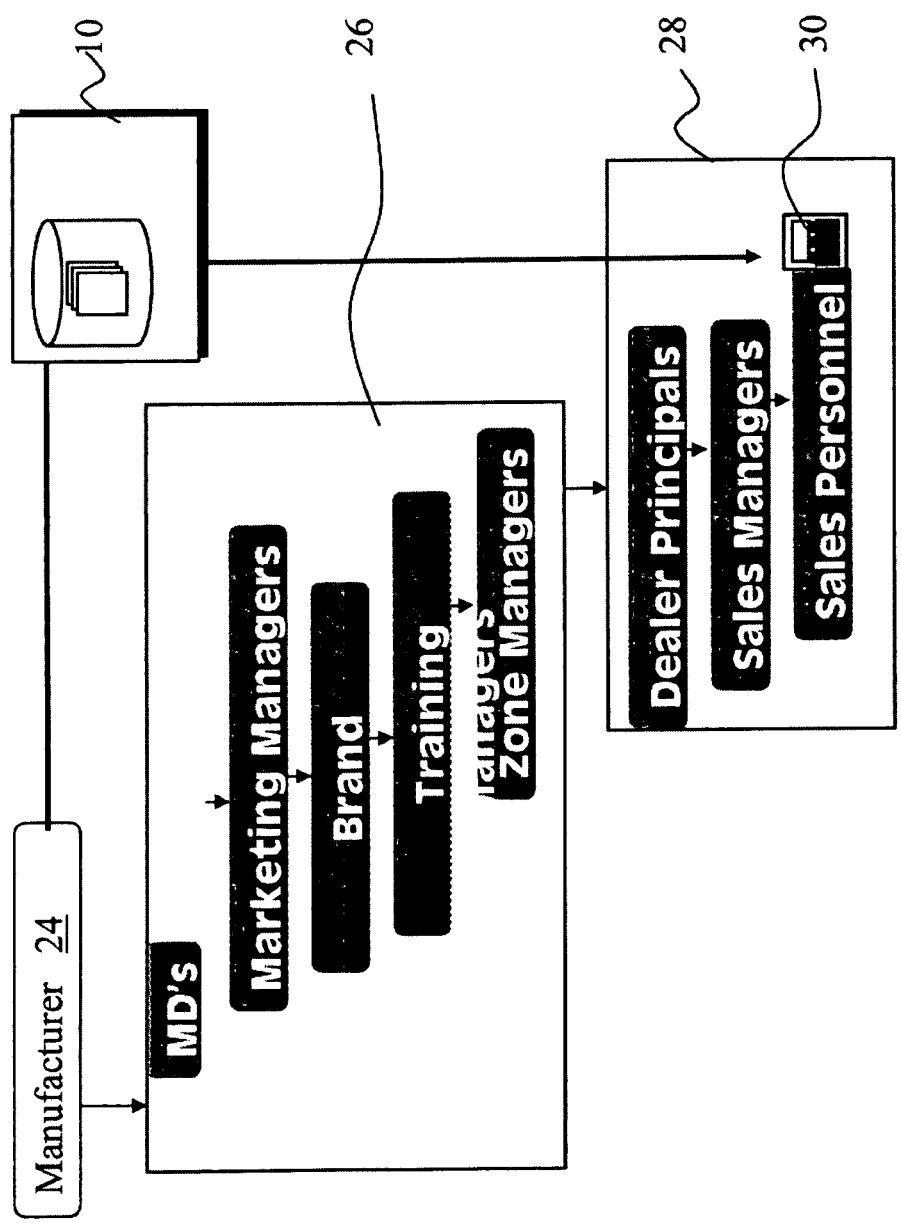
FIG. 2 shows signaling flows between a central data processing device and mobile data terminals in accordance with an embodiment.

FIG. 2 illustrates an embodiment for avoiding the conventional multilayered communications hierarchy of an automotive products sales organization. In a typical global sales organization a manufacturer 24 with global markets area communicates with national higher level sales sub-organizations 26, typically national or regional head offices or the like. Each country or region is typically divided into a plurality zones or areas, each with a local dealer or dealers 28. The manufacturer, i.e. the top level organization 24 then communicates necessary information to the local organizations with their own hierarchies. In such conventional organization information is necessarily passed vertically from a level to the other.

As shown in FIG. 2, an intermediate server 10 can be provided for enabling bidirectional communication directly between the manufacturer 24 and the sales personnel 29 interfacing with the actual clients of the manufacturer 24. The server 10 acts as an intermediate, gathering data preferably from various sources, filtering it if necessary, and adapting the presentations into a format that can be uniformly displayed and/or otherwise presented via the mobile data terminals 30.

Figure 3:
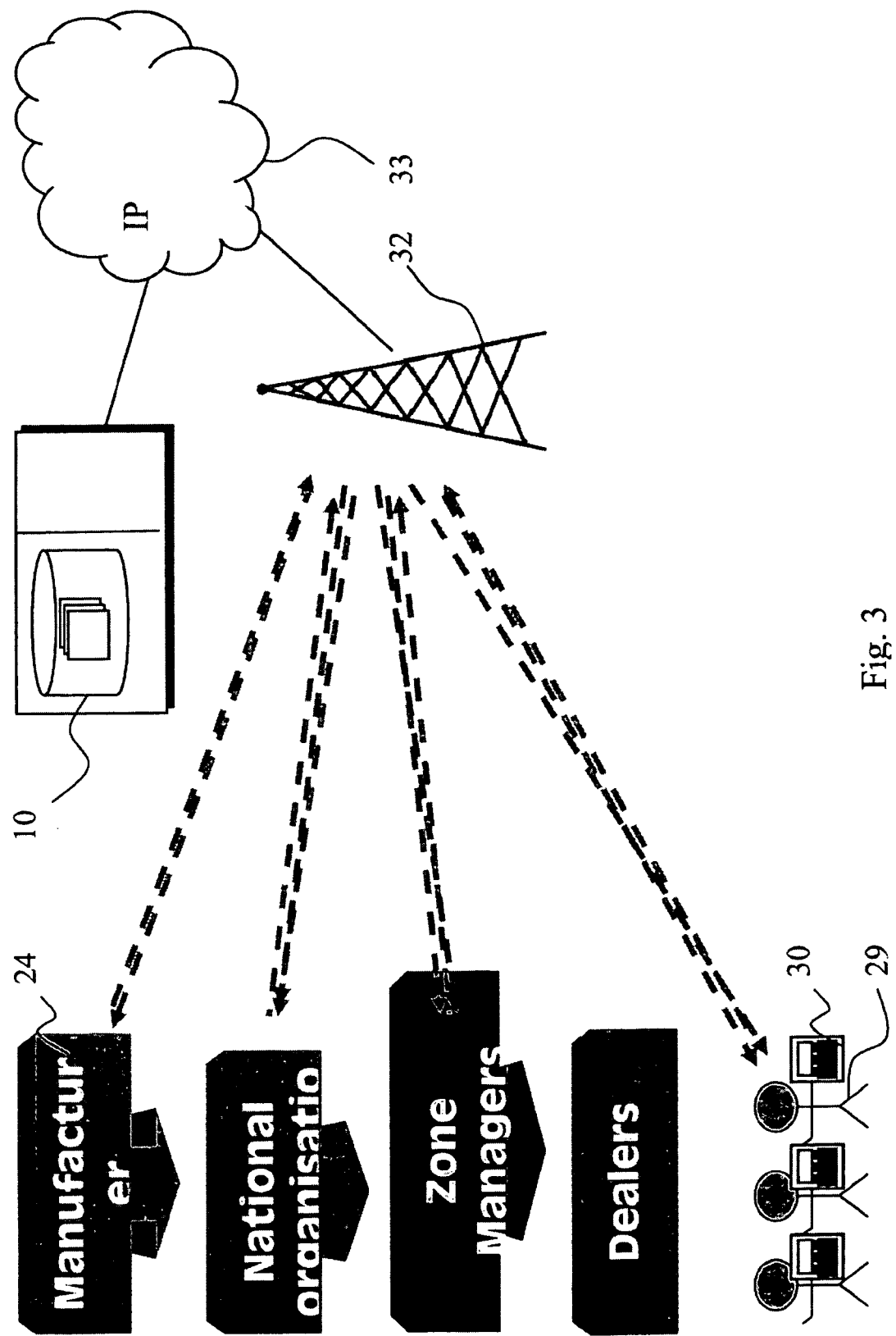
FIG. 3 shows signaling flows between various layers of a retail organization and a central data processing device in accordance with an embodiment.

FIG. 3 shows an embodiment where relevant personnel of all of the different levels of the sales organization hierarchy are all provided with appropriate mobile data terminals. All levels can communicate in accordance with similar protocols and practices with the intermediate server 10 via the wireless communication system 32.

FIG. 3 also shows the possibility of providing data communications between the terminals 30 and the intermediate server 10 via an IP protocol network 33. Communication between the manufacturer and the intermediate server 10 may also be provided via the IP network or directly via another data communication system. The latter may be required for example for security and/or capacity and/or interoperability reasons.

In accordance with an embodiment computer readable instructions for controlling, inter alia, presentation of data on user interfaces of mobile terminals and communication between an intermediate data processing device and the mobile terminals are generated and stored at the intermediate data processing device. For example, the instructions may be generated based on data gathered from a plurality of sources such as at least from one of the manufacturer's systems, the local dealer management systems and the distributed mobile users. The data may be at least temporarily stored at the intermediate data processing entity, and used when needed for data content creation, reporting and so on. The computer readable instructions can be communicated to the remote mobile terminals, either instantly after creation thereof, at a predefined future point of time or whenever needed.

The distributed users can also send back feedback data or any other user originated data that may be needed for management purposes. This data can be processed at the intermediate data processing entity 10, for example filtered, classified and so on, and/or stored. The storage of the user data can be either permanent or temporary. The intermediate data processing entity may communicate the user data as such and/or generate reports and/or enquiries based on the user data to the higher and/or lower level systems, for example to the manufacturer's systems, to the intermediate levels of the retail organization and/or to the local management systems.

Figure 4:
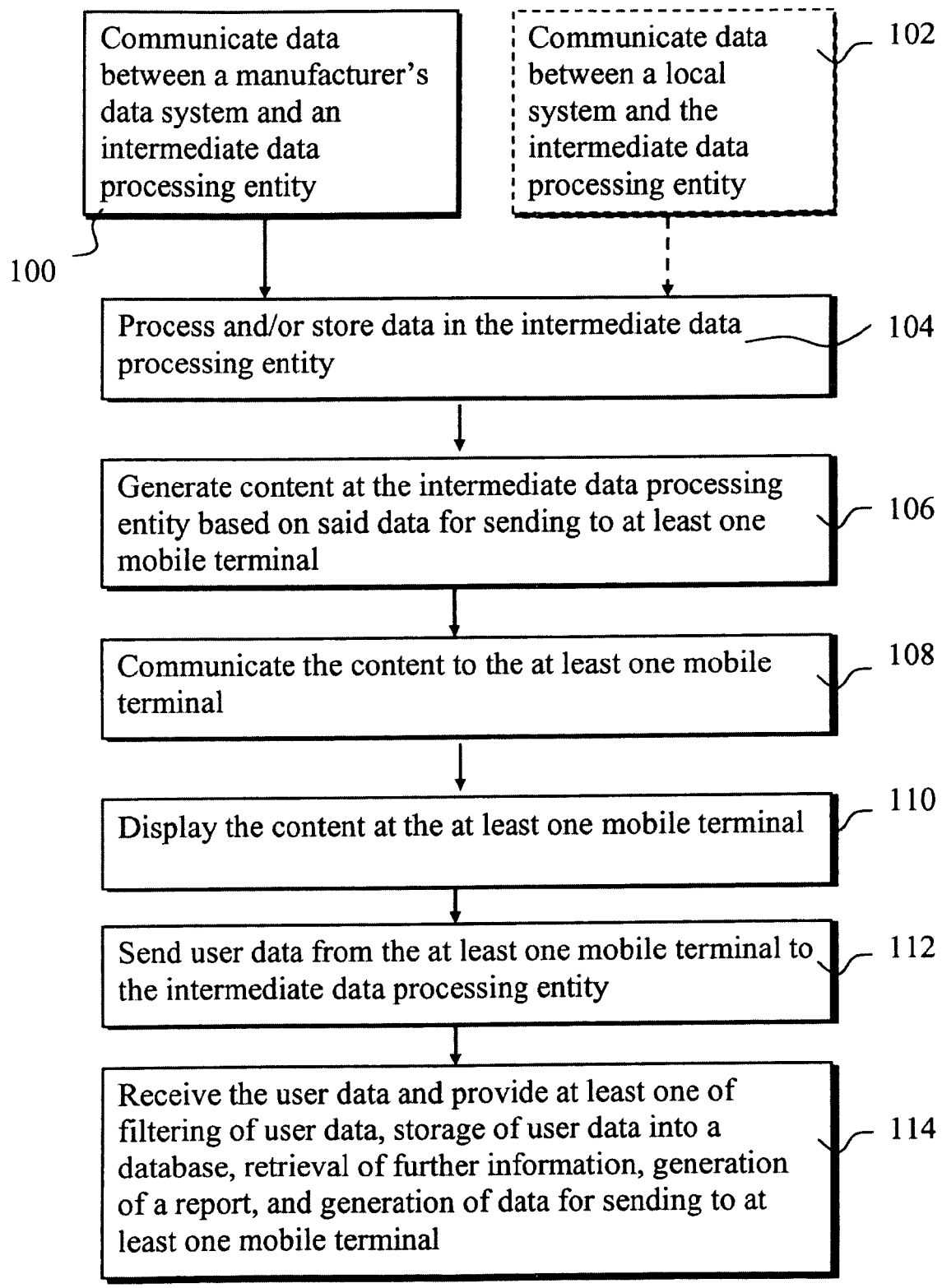
FIG. 4 shows a flowchart in accordance with an embodiment.

An exemplifying embodiment of the method is now described with reference to the flowchart of FIG. 4. In the flowchart data is shown to be communicated at 100 between a central data processing device of a provider of goods, for example a manufacturer of automotive products, and an intermediate data processing entity, for example a third party service provider server. Data can also be optionally communicated at 102 between at least one local system for managing a local retail unit and the intermediate data processing entity. Relevant data received from the manufacturer and/or the local management systems can be appropriately processed and/or stored in a database of the intermediate data processing entity at 104.

The intermediate data processing entity may generate content based on the data stored in the database and/or recently received from the user and/or the manufacturer and/or the management system at 106. The intermediate data processing entity may send the generated content data to at least one mobile data terminal via a data network at 108.

At least one mobile terminal may then receive the data. Based on the data content may then be displayed immediately to the user thereof at 110. Alternatively, the received data can be stored in a memory of the mobile terminal for later use. The data may be retrieved from the memory by a command by the user. Also, data may be fetched for example in response to receiving further data from the intermediate data processing entity. The further data may e.g. trigger a display based on data from a plurality of transmissions to the mobile terminal.

A user of the at least one mobile data terminal may be allowed to input data for delivery to the higher organizational levels. For example, the data is sent for the attention of the manufacturer. After the input is finished and upon appropriate command such as 'Send' the mobile terminal can then transmit the data to the intermediate data processing entity for further processing at 112 via a wireless access network. Thus the mobile terminal and the intermediate data processing entity enable two way communications for the distributed users and input of data into the systems of the manufacturer and/or requests for further information.

Upon receiving user data from the at least one mobile terminal, the intermediate data processing entity may also store at least part of the user data into its database at 114. It can also determine if it is necessary to communicate the data to the central data processing entity and/or the local management system and/or to respond to the remote user, as appropriate. The feedback or other data from the distributed users can be detected as being important at the intermediate data processing entity, and be delivered, after some possible filtering and modification, as soon as possible to the central data processing entity, or later as a part of a report. According to a possibility receipt of user data from the mobile user terminal triggers retrieval of data from the central data processing entity and/or the local management systems, as appropriate. Further content may be generated and communicated, for example to all distributed users, to selected distributed users, to selected levels of management hierarchy and/or to the manufacturer.

A plurality of remote users may each be provided with a similar mobile data terminal. In certain applications it may be advantageous to have groups of users each provided with a different type of mobile terminal. Selected data may then be communicated only to the selected type of mobile data terminals.

Data can be communicated to the mobile user terminals by means of a type of communication that is known as push transmissions. That is, the users do not need to request for any data, but instead the server 10 pushes data to all or selected mobile data terminals whenever there is a need to do so or it is otherwise appropriate e.g. for capacity and/or cost reasons. The data push may be triggered in response to detection of a predefined event in the intermediate data processing entity.

The data pushed to the mobile terminals can include a client interface application of the mobile user device and/or any content data, or at least a part of either of these. The client interface application is configured to provide various application specific features and commands, such as security features, menus, logos, manufacturer specific easy to use feedback options and so on.

Information can be presented on a user interface of at least one mobile data terminal substantially in real-time in response to detection of a triggering event.

Data can be modified, for example personalised, in the intermediate data processing entity based on information such as the identity of regarding the recipient user, address of the recipient user, the recipient user current location, and/or the type of the recipient user and so on. Such tailoring of data may comprise adapting communications to a mobile data terminal based on various pieces of information about the user and adapting data to be communicated to a mobile data terminal based on such information.

Figure 5:
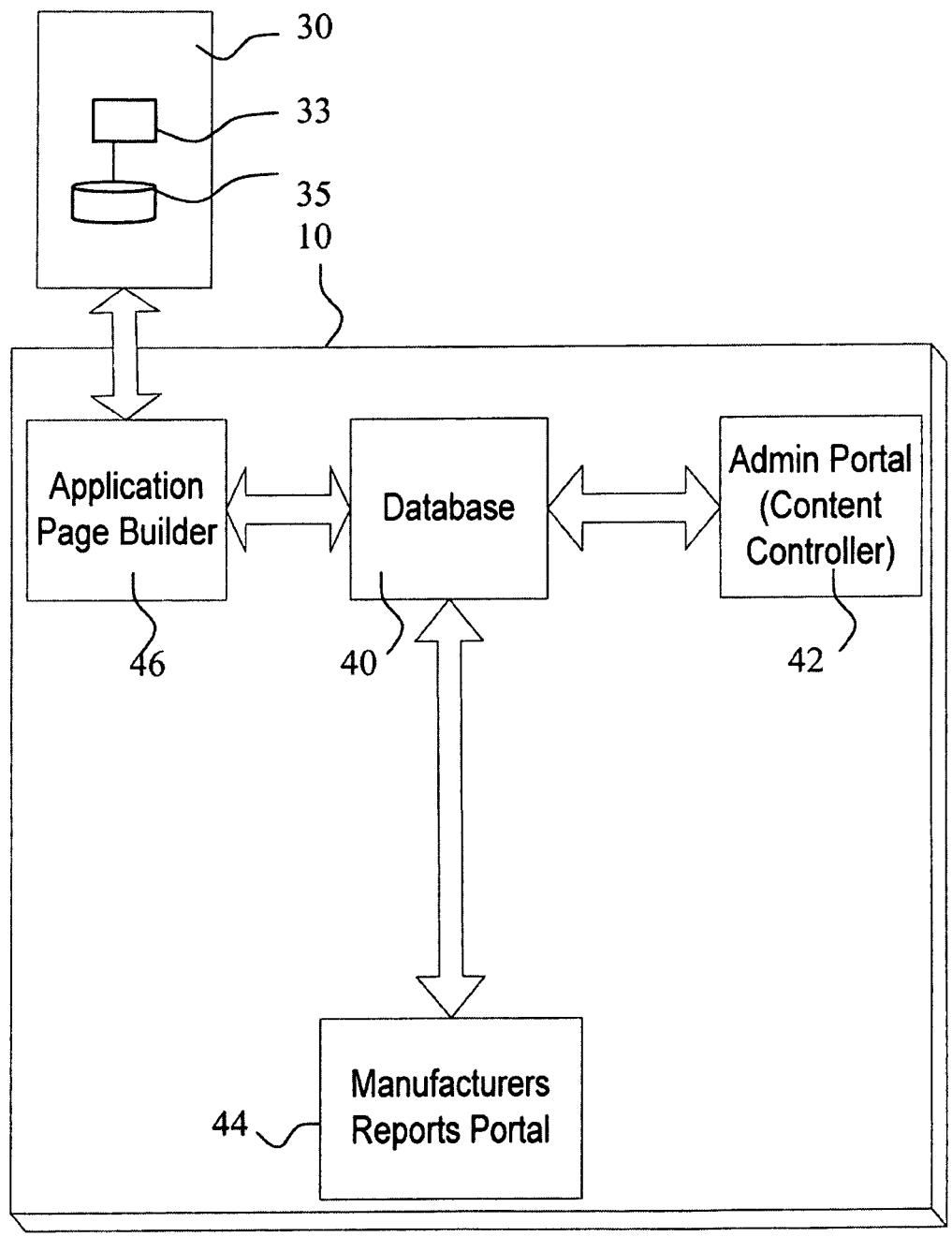
FIG. 5 shows an example for an intermediate data processing device in accordance with an embodiment of the invention.

The following describes in more detail with reference to FIG. 5 a possible example of a retail management application providing the above described method and system. In this example an information/training system is provided by deploying a single type of mobile data handsets 30, for example the BLACKBERRY™ handsets. A bespoke system is provided to deliver the information/training facility to distributed dealers as required by the particular business. The mobile data handsets are provided with appropriate client application software to deliver product and other sales information to dealer's sales personnel and to enable communication towards the intermediate server 10.

The system can be provided as separate modules in the intermediate data server 10 and a mobile handset 30 that interact with each other. The modules of the server 10 are referred to in FIG. 5 as portals.

A user interface application 33 can be provided as a module in the mobile data terminal 30. The user interface application is configured to control presentation of information by the terminal device and data storage in a memory 35 of the terminal and other data processing operations in relation to data from the server 10. The user interface application 33 is configured to enable content downloads and updating and other two directional communications over an air interface. The user interface application may be configured to present various application pages, or displays, based on data received from the intermediate server 10. For example, different displays may be provided for the purposes of giving product related information and specifications, product related training, news, incentives, promotions, finance offers, application such as finance calculator and so on. The interface applications may be created by any appropriate programming language such as Java, javascript, PHP and Mysql.

The modules in the intermediate server 10 can include a database 40 for storing data, inter alia, relating to the manufacturer and/or service provider, individual users, user groups, products and/or services and so on. Information can be stored in and retrieved from the database 40 as required by the other modules. For example, the mobile terminal 30, and more particularly the interface application thereof and an administration portal 42 can be configured to be able to add to and retrieve information from and store results of processing data in the database.

The administration portal 42 is for creation and control of content for the mobile terminals. The administration portal 42 can be configured to control various administrative tasks such as creation, update and deletion of details, setting security levels, tailoring of content and so on. It can also control training applications, for example create training hooks, remove such hooks, upload pictures for hooks, set valid dates for displaying hooks, select user groups for the hooks and so on, create quizzes, set valid dates for displaying quizzes, remove quizzes and select user groups for quizzes. News control may also be provided such that news items are created and removed, valid display dates and/or priorities are set, and news groups are selected. Similarly, incentives and promotion displays may be controlled e.g. in regard of item creation and deletion, setting of valid display dates and/or priorities and so on. Validation for sales, value levels for sales, select groups for sales and so forth may also be set by this module. A finance page display control may include features such as rates update, retail value update, insertion of new models and/or products, insertion of legal statements and so on.

The administration portal part of the application can receive content requests from the mobile terminals. It can also control page creation by a page builder application 46. A page to be displayed or other content data can thus be created by the page builder module 46 in response to a request from a user. The page can also be created in response to a triggering event, for example an indication from the manufacturer of a new product or modification in an existing product, important changes in stock levels, availability of certain models and/or delivery times and so on.

The content page can be generated based on information stored in the database and sent to the handset. The sending may be immediate, occur at set point of time in future or occur in response to a request from an individual user or e.g. a national or regional organisation.

Content added into the database or created can be provided with a set start and expiry dates. This enables automatic removal of content after it is no longer valid. Any report data for these items can be stored, should this be desired. Important information can be flagged. Important information can also be provided with a trigger that forces a display on the mobile terminal and an acknowledgement from the user that he/she has read it.

The intermediate server 10 can also be configured to generate various reports. The reports can be generated internally in the server by the administrative module 42 and these reports can then be used by a manufacturer's reports portal 44 for external reporting. Alternatively, the reporting module 44 can generate the reports itself based on data from the database and the mobile handsets. The manufacturer's reports portal 44 can be arranged such that it is only able to retrieve information from the database.

The reporting can cover various areas such as user data. For example, the report may list users who have compliant handsets and/or activated handsets, PIN numbers, email addresses, language preferences, location, client types, training details and other user details. In view of the training aspects the reports may, for example, list the names of those who have and who have not read training hooks, who have and who have not done a training quiz, start and finish times and times of training exercises taken by the users, answers and scores by the users and so on. Similarly, in view of news it may be considered worth reporting who has and who has not read the news, and when the news were read and what news were read. In view of the incentives reporting may cover for example, user targets, target levels, users who have reached the target, users who are over and below their targets, sales, league tables and so on. Usage of features such as promotions, finance, and products and specifications may also be reported.

Individual users may also receive performance reports from the intermediate data processing entity. This can assist in motivating them since the reports and appraisals can be seen as coming from "higher up" than from the local organization. Direct incentives may also be provided, even such that bypass the local organization.

Information about competitors and/or their products may also be delivered to the mobile terminals. The information may comprise sales argumentation over competing products and/or offerings. The intermediate data processing entity may obtain this information from the manufacturer and/or from external sources.

The mobile terminals can be used for collecting customer data. The customer data can be processed at the intermediate data processing entity to analyse, filter and organize it before delivery e.g. to the manufacturer, the local management systems and/or the mobile terminals.

Information of used vehicles may also be delivered. This can include information such as the latest "market" prices for various cars and models, possible reported demand for a particular make and model anywhere in the sales organisation, stocking lists and so on.

The administration or content control portal 42, the reporting portal 44 and the page creation portal 46 can be accessed via a web site. Thus these can be accessed from any computer that has access to the internet. Appropriate security measures such as username and password and firewall protection is recommended for any such applications.

To minimise load times and speed up delivery over the air interface content with excessive graphics and colours can be kept to a bare minimum. In certain application is may be preferred or even necessary, however, to deliver this kind of large volume files the terminals. Other types of large volume files that can be communicated to the terminals include audio and video files. Any large volume content such as sound content can be pushed out to handset at times when traffic is otherwise not excessive and loaded into handset memory so that all subsequent activations will be from locally stored files. This eliminates the need for a real time over the air data transfer of the otherwise typically large files in times when there might be capacity issues and/or when the data transfer might cost excessively.

The system can be used for example in connection with a worldwide automotive product dealer organisation. Therefore in some embodiments data is advantageously delivered in multiple languages. The intermediate server may adapt the data content to the language based on information of the user data preferences in the database thereof.

The above described functions may be provided by separate processors or by an integrated processor. Thus the required data processing functions for generation, update, modification, association and/or other related data processing functions may be provided by means of one or more data processors. An appropriately adapted computer program code product or products may be used for implementing the embodiments in the central data processing device and the handheld data processing devices. The program code product or any part thereof for providing the operation may be stored, at least temporarily, on appropriate storage medium and provided, in addition to a download via a data communication system, by means of a carrier medium such as a carrier disc, card or tape.

It is noted that the embodiments of the present invention are applicable to any other type of data communication system and handheld mobile data terminals suitable for data communication and interfacing the distributed users with the central location. It is also noted that although certain embodiments were described above by way of example with reference to certain exemplying architectures for data networks and servers, embodiments can be applied to any other suitable forms of data communication systems and processing devices than those illustrated and described herein. It is also noted that the term data network is understood to refer to any data communication system configured for enabling communication of data between remote locations.

It is also noted herein that while the above describes exemplifying embodiments of the invention, there are several variations and modifications which may be made to the disclosed solution without departing from the scope of the present invention.

I claim:

1. A method of data communication for a retail organization, comprising:
    sending from an intermediate data processing entity first data to at least one mobile terminal based on data from at least one data processing device associated with the retail organization for use in presentation of a user interface by the at least one mobile terminal based on the first data received from the intermediate data processing entity and generation of second data at the least one mobile terminal based on user generated content data input via the user interface for sending to the intermediate data processing entity for generation of further content data, wherein the user generated content data input by the user of the at least one mobile terminal comprises data collected by the user in relation to the goods, services and/or customers of the retail organization;
    receiving the second data at the intermediate data processing entity from at least one mobile terminal, wherein the second data comprises said user generated content data input by the user of the at least one mobile terminal;
    storing at least a part of said second data comprising said user generated content data received by the intermediate data processing entity in a database associated with the intermediate data processing entity;
    generating third data comprising further content data at the intermediate data processing entity based at least in part on said second data comprising said user generated content data; and
    communicating the third data comprising said further content data from the intermediate data processing entity to at least one of at least mobile terminal and/or at least one data processing device associated with the retail organization.

2. The method as claimed in claim 1, comprising providing a plurality of remote users each with a mobile terminal of a first type and communicating selected data only to said mobile terminals of the first type.

3. The method as claimed in claim 2, comprising providing all remote users with a mobile terminal of the first type.

4. The method as claimed in claim 1, comprising pushing data from the intermediate data processing entity to the at least one mobile terminal.

5. The method as claimed in claim 4, wherein sending of the first data comprises pushing at least a part of an application to the at least one mobile data terminal.

6. The method as claimed claim 4, wherein communicating of the third data comprises pushing said further content data to the at least one mobile data terminal.

7. The method as claimed in claim 1, comprising managing the intermediate data processing entity by a party that is separate from the retail organization.

8. The method as claimed in claim 1, comprising detecting a predefined event in the intermediate data processing entity, and in response thereto sending instructions to present information by means of the at least one mobile terminal.

9. The method as claimed in claim 8, comprising presenting information by the at least one mobile terminal substantially in real-time after said detection of the triggering event.

10. The method as claimed in claim 1, comprising adapting data for presentation on a relatively small display.

11. The method as claimed in claim 1, comprising generating a report based on said second data input by the user.

12. The method as claimed in claim 1, comprising assigning validation information to data.

13. The method as claimed in claim 1, comprising communication of data between the intermediate data processing entity and the at least one mobile terminal at predefined times.

14. The method of claim 1, comprising providing said at least one mobile terminal with a user interface application for control of presentations, and wherein the communicating of third data comprises communicating updated content data from the intermediate data processing entity for use by the user interface application.

15. The method as claimed in claim 1, wherein the second data is input at the at least one mobile terminal after reception of said first data.

16. The method as claimed in claim 1, wherein the second data comprises data collected by means of the at least one mobile terminal regarding at least one of customers, market prices, demand and stock.

17. An apparatus for an intermediate data processing entity, comprising:
  an interface configured for communication of first, second and third data with at least one mobile terminal, wherein the first data comprises data based on data from at least one data processing device associated with a retail organization, the second data comprises user generated content data input via a user interface of the at least one mobile terminal by the user thereof, and the third data comprises further content data generated based at least in part on said second data;
    a database for storing at least a part of the second data comprising said user generated content data received from the at least one mobile terminal; and
  at least one processor configured to cause sending of the first data to the at least one mobile terminal for use in presentation of the user interface by the at least one mobile terminal based on the first data from the intermediate data processing entity and generation of said second data at the least one mobile terminal based on user generated content data input via the user interface for sending to the intermediate data processing entity for generation of said further content data, wherein the user generated content data input by the user of the at least one mobile terminal comprises data collected by the user in relation to the goods, services and/or customers of the retail organization, to process the second data comprising said user generated content data received from the at least one mobile terminal to generate the third data comprising said further content data based at least in part on the second data and to control communication of the third data to at least one mobile terminal and/or at least one data processing device associated with the retail organization.

18. The apparatus as claimed in claim 17, wherein the at least one processor is configured to communicate selected data based on the type of the mobile terminals.

19. The apparatus as claimed in claim 17, configured to push data to the at least one mobile terminal.

20. The apparatus as claimed in claim 17, wherein the at least one processor is configured to, in response to a predefined event, send instructions to present information by means of the at least one mobile terminal.

21. The apparatus as claimed in claim 17, wherein the at least one processor is configured to adapt the data for presentation on a relatively small display.

22. The apparatus as claimed in claim 17, wherein the at least one processor is configured to generate a report based on the second data received from the at least one mobile terminal.

23. The apparatus as claimed in claim 17, wherein the at least one processor is configured to assign validation information to generated data.

24. The apparatus as claimed in claim 17, wherein the at least one processor is configured to communicate data to the at least one mobile terminal at predefined times.

25. The apparatus of claim 17, wherein the at least one processor is configured to
  provide said at least one mobile terminal with a user interface application for control of presentations;
  update content data stored at the database based at least in part on the second data comprising said user generated content data, and
  communicate the updated content data for use by the user interface application.

26. The apparatus as claimed in claim 17, wherein the second data comprises data that is input at the at least one mobile terminal after reception of said first data.

27. The apparatus as claimed in claim 17, wherein the second data comprises data regarding at least one of customers, market prices, demand and stock.

28. A system for data communications in a retail organization, comprising:
  at least one data processing device associated with a retail organization;
  an intermediate data processing entity connected to the at least one data processing device and to a data network; and
  at least one mobile terminal configured to receive first data from the intermediate data processing entity, to present information based on the said first data, to provide a user interface for input of user generated content data by a user thereof to generate second data, and to send the second data to the intermediate data processing entity,
  wherein the intermediate data processing entity is configured to send the first data to the at least one mobile terminal, to process the second data comprising said user generated content data received from the at least one mobile terminal to generate third data comprising further content data based at least in part on the second data and to control communication of the third data to at least one mobile terminal and/or at least one data processing device associated with the retail organization and the at least one mobile terminal is configured to present a user interface based on the first data received from the intermediate data processing entity, generate the second data based on user generated content data input by the user via the user interface, wherein the user generated content data comprises data collected by the user in relation to the goods, services and/or customers of the retail organization, and send the generated second data to the intermediate data processing entity for generation of further content data.

29. A computer program embedded in a non-transitory computer-readable storage medium and comprising program code means adapted to perform the steps of:

sending a first data from an intermediate data processing entity to at least one mobile terminal based on data from at least one data processing device associated with a retail organization for use in presentation of a user interface by the at least one mobile terminal based on the first data received from the intermediate data processing entity and generation of second data at the least one mobile terminal based on user generated content data input via the user interface for sending to the intermediate data processing entity for generation of further content data, wherein the user generated content data input by the user of the at least one mobile terminal comprises data collected by the user in relation to the goods, services and/or customers of the retail organization;

receiving second data at the intermediate data processing entity from the at least one mobile terminal, wherein the second data comprises said user generated content data input by the user of the at least one mobile terminal;

storing at least a part of said second data comprising said user generated content data received by the intermediate data processing entity in a database associated with the intermediate data processing entity;

generating third data comprising further content data at the intermediate data processing entity based at least in part on said second data comprising said user generated content data; and communicating the third data comprising said further content data from the intermediate data processing entity to at least one of at least mobile terminal and/or at least one data processing device associated with the retail organization.

30. A computer program product comprising program code means of claim 29 stored in a non-transitory computer readable medium.

* * * * *